(No Model.)
O. B. SHALLENBERGER.
ELECTRIC CONVERTER.
No. 373,029. Patented Nov. 8, 1887.
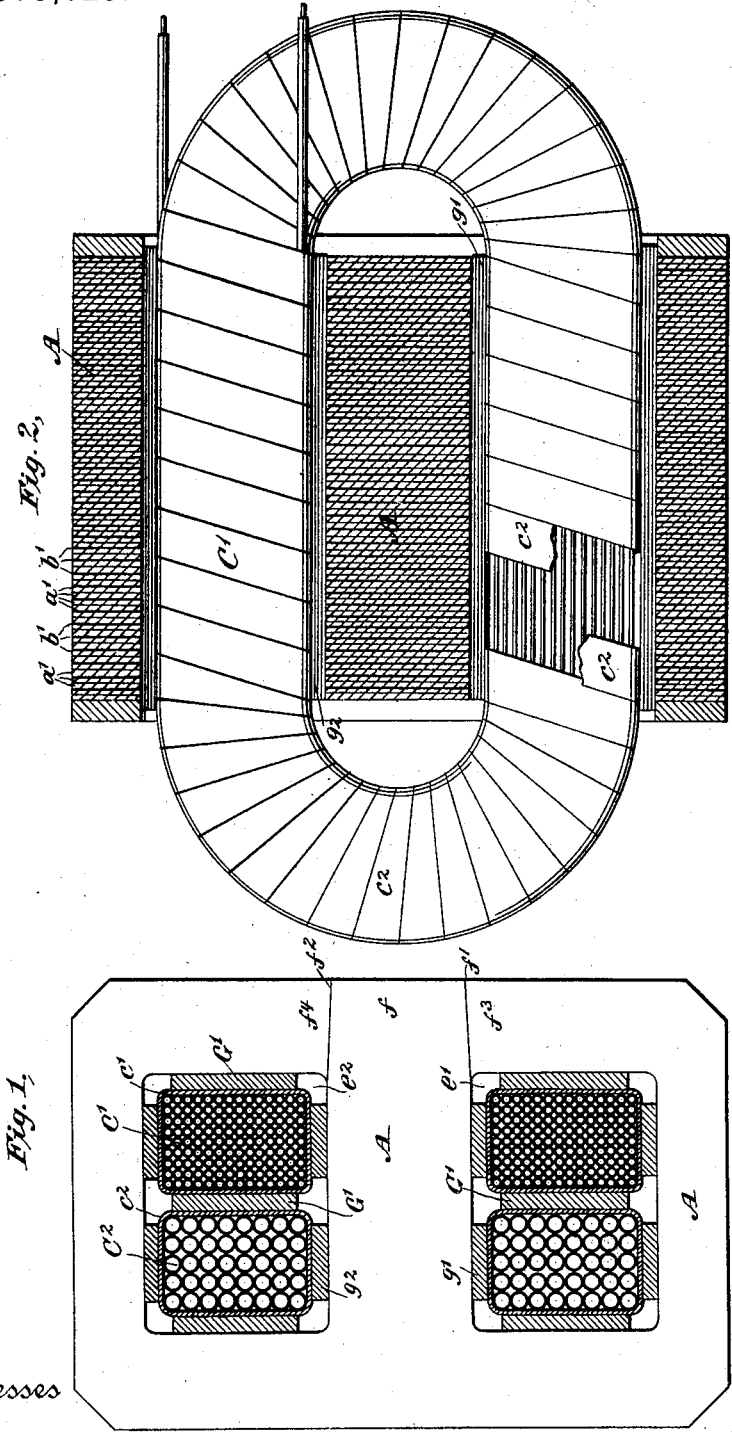
Witnesses
Geo. W. Breck
Carrie E. Ashley
Inventor
O. B. Shallenberger
By his Attorneys
Pope Edgecomb & Terry

UNITED STATES PATENT OFFICE.

OLIVER B. SHALLENBERGER, OF ROCHESTER, PENNSYLVANIA.

ELECTRIC CONVERTER.

SPECIFICATION forming part of Letters Patent No. 373,029, dated November 8, 1887.

Application filed April 14, 1887. Serial No. 234,700. (No model.)

*To all whom it may concern:*

Be it known that I, OLIVER B. SHALLENBERGER, a citizen of the United States, residing in Rochester, in the county of Beaver and State of Pennsylvania, have invented certain new and useful Improvements in Electric Converters, of which the following is a specification.

The invention relates to the class of devices known as "electric converters," and employed for transferring electric currents from one circuit into another by induction. Such devices usually consist of two coils of insulated wire, termed the "primary" and "secondary" coils, and a mass of soft iron acted upon by currents traversing the primary coil and in turn inducing currents in the secondary coil.

The special object of this invention is to provide means for preventing any accidental discharge of electricity between the primary and secondary coils. These coils are variously proportioned with reference to each other to produce the required changes in the conditions or factors of the currents. The cores are preferably formed of thin plates or sheets of soft iron magnetically separated from each other to a greater or less extent.

Prior to my invention it had been customary to wind the primary and secondary coils together, or else to wind one coil outside the other. The present invention consists in winding the two coils separately and covering each coil with a separate insulation, thereby rendering each coil complete in itself. The soft-iron core is then applied to the two coils, which are preferably placed side by side.

In the accompanying drawings, Figure 1 is a cross-section, and Fig. 2 a longitudinal section, of an electric-converter embodying the features of the invention.

Referring to the figures, A represents a core of a converter, and C' and C² the primary and secondary coils, respectively. The core is preferably composed of thin sheets or plates $a'$ $a'$ of iron, alternate plates being magnetically separated by thin sheets $b'$ $b'$ of non-magnetic material—such, for instance, as paper. These sheets may with advantage be pasted or glued to the plates of iron.

In preparing the plates rectangular sheets are stamped with holes $e'$ $e^2$, which are of the proper size and shape for receiving the primary and secondary coils. Each opening is preferably cut open, as shown at $f'$ $f^2$, respectively, to allow the plates to be placed upon the coils. The central tongue, $f$, is designed to extend through the interior of the coils. The separate plates are applied by springing back the portions $f^3$ $f^4$ and placing the tongue through the coils, then allowing the plate to resume its normal condition.

For the purpose of breaking joints the alternate plates are preferably inserted from opposite sides, so that the slits $f'$ $f^2$ of one plate are against the solid portions of the two adjacent plates.

The insulated wires are wound upon suitable blocks or mandrels, which are adapted to form them into oblong coils having rectangular cross-section. The coils are then wound or covered with insulating material $c'$ $c^2$, respectively. This may with advantage consist of strips of cloth, canvas, or tape, which are preferably saturated with some non-conducting substance of any suitable character and wound continuously upon the coils, as shown in Fig. 2. The entire coils being thus covered are placed side by side and fastened together before the core-plates are applied. The two coils may, if desired, be separated from each other by additional insulating material—such, for instance, as strips of paper or leatheroid—as shown at G'. Similar strips, $g'$ $g^2$, may be applied to the outer surfaces of the coils to separate them from the iron of the core. By means of these separate coverings the insulation between the two circuits is rendered more perfect, and a great reduction of the static capacity of the coil is secured, since only the small external surfaces are presented to each other, and these are some distance from each other; and also the converter is much more easily constructed, and different standard coils may be placed in different converters where different ratios of conversion are desired.

It will be understood that the invention is not in any way limited to the form of core nor to the precise shape of the coils herein shown and described, but these may be variously modified to suit different cases.

I claim as my invention—

1. The combination, with the core of an electric converter, of primary and secondary coils therefor, separately wound and covered with separate insulation, substantially as described.

2. In an electric converter, primary and secondary coils separately wound, and a covering of insulating material applied to each coil independently of the other, substantially as described.

3. The combination of the primary and secondary coils of an electric converter, said coils being separately wound and separately insulated and placed side by side, and a core of soft iron to which the coils are applied.

In testimony whereof I have hereunto subscribed my name this 6th day of April, A. D. 1887.

OLIVER B. SHALLENBERGER.

Witnesses:
W. D. UPTEGRAFF,
LEW B. STILLWELL.